(12) United States Patent
Van Steenbrugge

(10) Patent No.: US 6,694,030 B1
(45) Date of Patent: Feb. 17, 2004

(54) APPARATUS AND METHOD FOR REPRODUCING A DIGITAL AUDIO SIGNAL FROM A RECORD CARRIER

(75) Inventor: Bernard Van Steenbrugge, Eindhoven (NL)

(73) Assignee: Koninlijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/070,214

(22) Filed: Apr. 30, 1998

(30) Foreign Application Priority Data

Jun. 3, 1997 (EP) .............................. 97201658

(51) Int. Cl.[7] ........................ H04B 15/00; G06F 17/00; G10L 19/00; G11B 15/52
(52) U.S. Cl. ..................... 381/94.5; 381/94.1; 700/94; 704/500; 369/47.17; 369/47.18; 369/53.31; 368/124
(58) Field of Search ................. 381/94.1, 124, 381/61, 94.5; 369/47.17, 47.23, 47.25, 47.27, 53.31, 53.33, 53.37; 386/97–100; 700/94; 704/270, 500

(56) References Cited

U.S. PATENT DOCUMENTS

| | | | | |
|---|---|---|---|---|
| 5,276,714 A | * | 1/1994 | Hori et al. ................... | 375/116 |
| 5,428,592 A | * | 6/1995 | Endo ........................ | 369/47.17 |
| 5,528,572 A | * | 6/1996 | Koizumi et al. .............. | 369/47 |
| 5,546,369 A | * | 8/1996 | Lee et al. ................. | 369/47.18 |
| 5,590,100 A | * | 12/1996 | Ogusu et al. ................. | 369/32 |
| 6,076,062 A | * | 6/2000 | Van Steenbrugge ......... | 700/500 |
| 6,154,548 A | * | 11/2000 | Bizzan ....................... | 381/94.5 |
| 6,269,065 B1 | * | 7/2001 | Ogura et al. .................. | 369/94 |
| 6,272,285 B1 | * | 8/2001 | Abe et al. .................... | 386/124 |
| 6,311,161 B1 | * | 10/2001 | Anderson et al. ........... | 704/500 |
| 6,341,199 B1 | * | 1/2002 | Okada et al. ................. | 386/98 |
| 6,476,878 B1 | * | 11/2002 | Lafay et al. ................ | 348/738 |
| 6,597,645 B2 | * | 7/2003 | Heo ........................ | 369/47.16 |

\* cited by examiner

Primary Examiner—Xu Mei
Assistant Examiner—Laura A. Grier

(57) ABSTRACT

A reproducing apparatus for reproducing an audio signal from a record carrier having a first digital audio signal (a PCM encoded audio signal) recorded on it in a first format and a second digital audio signal (an MPEG encoded multi channel audio signal) recorded on it in a second format. The apparatus includes a read unit for reading an information signal from the record carrier, a decoding unit for channel decoding the information signal read from the record carrier into a decoded information signal, a keyboard for receiving a selection signal and an output terminal for supplying an output signal which comprises either the first digital audio signal or the second digital audio signal in response to said selection signal. An output circuit is available to add an identification signal (bit $b_1$) into the output signal, indicating that the output signal includes either the first digital audio signal or another audio signal. Further, a muting circuit mutes the first digital audio signal supplied by the output circuit in response to an occurrence of the selection signal for selecting the second audio signal. The muting circuit maintains the output circuit in a muted situation from the moment of occurrence of the selection signal until a certain time interval after the corresponding change in the identification signal.

8 Claims, 1 Drawing Sheet

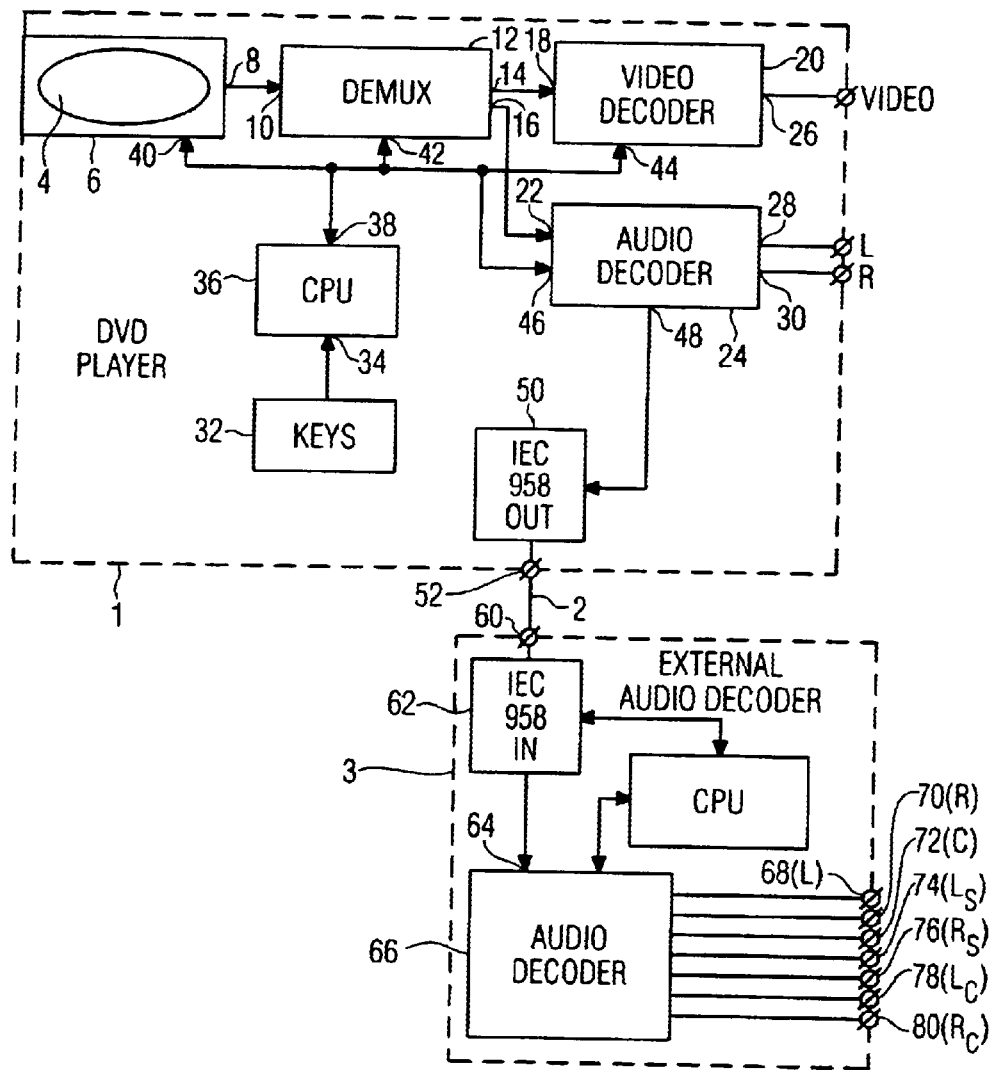
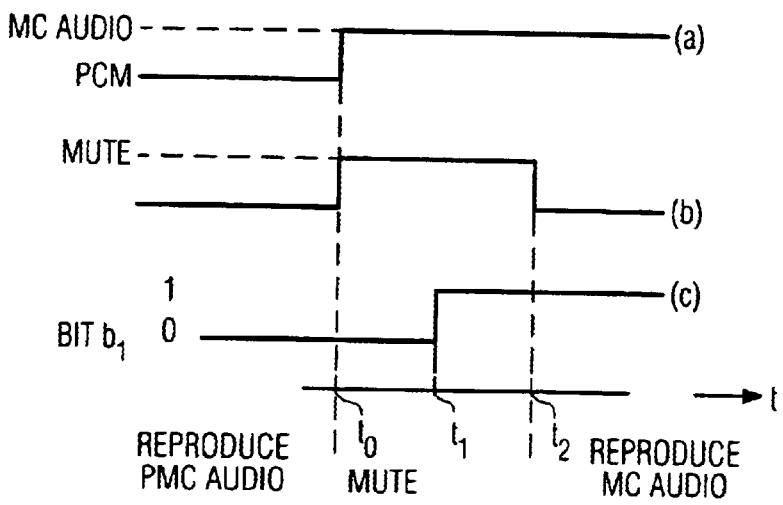
FIG. 1
FIG. 2

APPARATUS AND METHOD FOR REPRODUCING A DIGITAL AUDIO SIGNAL FROM A RECORD CARRIER

BACKGROUND OF THE INVENTION

1. Technical Field

The invention relates to an apparatus for reproducing a digital audio signal from a record carrier, the record carrier having a first digital audio signal recorded on it in a first format and a second digital audio signal recorded on it in a second format, the apparatus comprising read means for reading an information signal from the record carrier, decoding means for channel decoding the information signal read from the record carrier into a decoded information signal, input means for receiving a selection signal, output means for supplying an output signal which comprises either the first digital audio signal or the second digital audio signal in response to said selection signal, said output means further being adapted to include an identification signal into said output signal, said identification signal indicating that said output signal comprises either said first digital audio signal or another audio signal, and to a method for reproducing said digital audio signal.

2. Related Art

An apparatus as defined in the opening paragraph is well known in the art in the form of a DVD video reproducing apparatus, such as described in the JEI, December 1996, the publication titled 'Intriguing DVD technology opens broad possibilities', pp. 21–25, document D1 in the list of related documents that can be found at the end of this description.

SUMMARY OF THE INVENTION

DVD video disks have a first digital audio signal stored on it in a first format, which is the well known linear PCM format. The first digital audio signal comprise the left and right hand signal components of a stereo audio signal. Further, the DVD disk has a second digital audio signal stored on it in a second format, which is in an MPEG encoded format. The second digital signal can be in a multi channel form and may comprise left and right hand signal components, as well as a centre signal component and one or two surround signal components.

The apparatus has an IEC 958 output interface for supplying the audio signals to an external decoder, which comprise a multi channel decoder for decoding the second digital audio signal into said signal components.

The invention aims at providing an improved reproduction apparatus. The reproducing apparatus in accordance with the invention further comprises muting means for muting the first digital audio signal supplied by the output means in response to an occurrence of said selection signal for selecting said second audio signal, said muting means maintaining said output means in a muted situation from said moment of occurrence of said selection signal until a certain time interval after the corresponding change in said identification signal.

The invention is based on the following recognition. The prior art reproducing apparatus has the possibility to reproduce at least two digital audio signals. The first audio signal can be the audio signal that is encoded in linear PCM form.

When reproducing the first digital audio signal, this audio signal is applied to the output means, such as the IEC 958 digital audio interface, and can be supplied to an external audio decoder apparatus. For decoding the linear PCM audio signal, the external apparatus comprise an D/A converter.

When switching over the prior art reproducing apparatus in a second reproduction mode, in which an MPEG encoded audio signal is reproduced, the MPEG encoded audio signal is supplied to the IEC 958 audio interface. The external apparatus further comprise an MPEG decoder in order to decode the MPEG encoded audio signal. Upon switching the prior art reproducing apparatus into the second reproduction mode, the information stream on the IEC 958 interface changes from a linear PCM encoded audio signal into an MPEG encoded audio signal. The external apparatus has to detect the change in contents of the information stream. This requires some time. During this time interval, however, the D/A converter receives information that it cannot decode. As a result, a severely distorted signal will be outputted by the external apparatus, which signal may destroy the loudspeakers coupled to the external apparatus.

By muting the audio signal supplied to the IEC 958 interface during the transition, it will be avoided that a severely distorted output signal will be generated by the external apparatus. This muting is realized by detecting the selection signal and generating a mute signal in response thereto. Further, the muting is maintained a certain time interval after the corresponding change in said identification signal. The identification signal is, in the example of the IEC 958 interface, the second bit ($b_1$) in the channel status signal channel on the IEC 958 interface. This bit identifies the interface to be in a normal audio mode or in a 'non-audio mode'. In the 'normal audio mode', the audio signal present on the interface is a linear PCM encoded audio signal, that can be decoded by a standard D/A converter in the external apparatus. When no linear PCM encoded audio signal, such as the MPEG encoded signal, is present on the interface, the interface is in the 'non-audio mode'. The length of the certain time interval identified above, has a relationship with the time interval that the external apparatus needs to detect the change in said identification signal.

BRIEF DESCRIPTION OF THE DRAWINGS

These and other aspects of the invention will be apparent from and elucidated with respect to the embodiments described hereafter in the figure description, in which FIG. 1 shows an embodiment of the reproduction apparatus of the invention, coupled to an external decoder, and FIG. 2 shows some timing diagrams.

DETAILED DESCRIPTION OF THE INVENTION

FIG. 1 shows the combination of a reproduction apparatus 1 in accordance with the invention, which is coupled via an IEC 958 interface bus 2 with an external audio decoder apparatus 3. In the present example, the reproduction apparatus 1 is in the form of a DVD player for reproducing information from a DVD video disk 4. The reproduction apparatus 1 comprises a reading unit 6, comprising a read head (not shown), such as an optical read head, for reading the information from the disk 4 and for supplying the information read from the disk 4 to an output 8. The output 8 is coupled to an input 10 of a demultiplexer 12, which has two outputs 14 and 16. The output 14 is coupled to an input 18 of a video decoder 20 and the output 16 is coupled to an input 22 of an audio decoder 24. An output 26 of the video decoder 20 forms a video output of the apparatus 1. The audio decoder 24 has two outputs 28 and 30 that form a stereo audio output of the apparatus 1.

The apparatus 1 further comprises keys 32 for inputting instructions to the apparatus by a user. The keys 32 are coupled to an input 34 of a central processing unit 36. An input/output terminal 38 of the processing unit 36 is coupled to corresponding control input/output terminals 40, 42, 44 and 46 of the reading unit 6, the demultiplexer unit 12, the video decoder 20 and the audio decoder 24 respectively. A further output 48 of the audio decoder 24 is coupled to an output unit 50, for supplying an audio signal in accordance with the IEC 958 audio interface format to an output terminal 52.

The apparatus 1 is adapted to read the information recorded on the disk 4 and to supply the information read from the disk to the demultiplexer 12. In the demultiplexer some channel decoding will be carried out so as to obtain channel decoded information. Further, the demultiplexer 12 derives video signal information from the channel decoded information and supplies this information to the output 14, for further processing in the video decoder 20, and derives audio signal information from the channel decoded information and supplies this information to the output 16, for further processing in the audio decoder 24.

In response to a selection made by the user via the keys 32, the central processing unit 36 generates a control signal for the audio decoder 24, which enables the audio decoder 24 to select either the linear PCM encoded signal or the MPEG encoded audio signal from the audio signal information and supplies the selected audio signal to the outputs 28,30.

When the linear PCM encoded audio signal is selected for further processing, the audio decoder 24 retrieves this PCM audio signal from the information supplied to its input 22 and supplies this PCM audio signal to a D/A converter (not shown) present in the decoder 24. As a result, a stereo audio signal is supplied to the outputs 28,30 of the apparatus 1.

When the MPEG encoded audio signal is selected, the audio decoder 24 retrieves the information corresponding to the MPEG encoded multi channel audio signal from the signal applied to its input 22 and derives a compatible stereo signal therefrom, which is supplied to the outputs 28,30.

It should thus be noted that, in the present example, for economical reasons, the apparatus 1 is not provided with a multi channel output, in order to supply the multi channel audio signal as such to an output.

In order to enable the reproduction of this multi channel audio signal, it is required to couple an external multi channel audio decoder, such as the decoder 3, to the apparatus 1. This is realized in FIG. 1 by coupling the apparatus 1 to the decoder 3 via the IEC 958 audio interface 2.

The structure and the format of the IEC 958 audio interface is well known in the art. Reference is made in this respect to the IEC Standard 958, document D2 in the list of related documents. Further, reference is made to WO 97/133.339, which corresponds to U.S. Ser. No. 08/724,390, (PHN 15.503), document D3 in the list of related documents and PCT international patent appln. no. IB96/1267 (PHN 15.603), document D4 in the list of related documents, which disclose an extended format for also transmitting multi channel audio signals.

The information stream on the IEC 958 interface is built up of successive blocks of 192 frames (denoted frame no. 0 to frame no. 191), each frame comprising two subframes. Each subframe is divided into 32 time slots (or bits), numbered 0 to 31. One channel which is comprised in the information stream, is the channel comprising the 'channel status' signal. The 'channel status' signal is the signal comprised in the 31st time slot (bit no. 30) in each subframe. The 'channel status' signal is organized in 192-bit words, denoted b0 to b191 inclusive. The bit $b_1$ indicates, when being '0', that the interface is in a 'normal audio' transmission mode. In this situation, regular linear PCM encoded audio signals are transmitted via the interface, so that a D/A converter coupled to the interface can decode the PCM encoded audio signals. The bit $b_1$, when being '1', indicates that the interface is in a 'non-audio' transmission mode.

When the apparatus 1 is switched into the first reproduction mode, in which the linear PCM encoded audio signal is selected in the apparatus 1 for reproduction, the audio decoder 24 retrieves the left and right hand signal components of the stereo audio signal from the signal applied to its input 22 and is supplies them in the IEC 958 transmission format to the output 52. The bit $b_1$ in the channel status signal is now '0'.

When the MPEG encoded audio signal is selected, the audio decoder 24 retrieves the information corresponding to the MPEG encoded multi channel audio signal from the signal applied to its input 22 and supplies the multi channel audio signal in the IEC 958 transmission format to the output 52. The bit $b_1$ in the channel status signal is now '1'.

The functioning of the reproduction apparatus 1 will now further be described with reference to the signal diagrams of FIG. 2a to 2c. It will be explained how the apparatus 1 functions under the influence of a selection made by the user via the keys 32, to select the MPEG encoded audio signal instead of the PCM encoded audio signal for reproduction. Prior to a time instant $t_0$, the reproduction apparatus is in the first reproduction mode, in which the PCM encoded audio signal is reproduced. FIG. 2a shows the selection signal supplied by the processing unit 36 to the audio decoder 24, which selection signal is 'low', prior to the time instant $t_0$. Upon selecting the second reproduction mode, the selection signal supplied by the CPU 36 to the audio decoder 24 changes from a 'low' state to a 'high' state at the time instant $t_0$, see FIG. 2a. In response to the change in the selection signal, as shown in FIG. 2a, the audio decoder 24 mutes its output during a time interval that follows the change in the selection signal. As an example, this mute period starts upon the change of the selection signal at the time instant to, and lasts for a time period of $t_2-t_0$, see FIG. 2b. More specifically, this time period is determined by the moment at which the bit $b_1$ in the channel status signal changes, namely at the time instant $t_1$, see FIG. 2c, and lasts a time interval $t_2-t_1$ after this time instant. The time interval $t_2-t_1$ is determined by the time required by the external audio decoder to detect the first time the bit $b_1$ in the channel status signal changes from '0' to '1'. As the rate of occurrence of the bit $b_1$ in the channel status signal is roughly 500 Hz, this time interval $t_2-t_1$ is 2 ms at minimum.

In order to safeguard a correct detection of the change of the bit $b_1$ in the channel status signal, by the external audio decoder to be connected via the interface 2 to the apparatus 1, the time interval $t_2-t_1$ could have a substantially larger value, such as eg. 8.2 ms.

Thus, prior to the time instant to, the audio decoder 48 supplies a PCM encoded stereo audio signal via the interface 2, is in a muted mode in the time interval between $t_0$ and $t_2$, so that zero amplitude audio samples are supplied via the interface 2 and supplies the multi channel audio signal in MPEG encoded form via the interface 2 after the time instant $t_2$.

This avoids an external audio encoder coupled to the apparatus 1 to generate a severely distorted output signal at its audio output(s).

The external audio decoder 3 comprises an input terminal 60 for receiving the IEC 958 transmission signal. The terminal 60 is coupled to an input unit 62, for receiving an audio signal in accordance with the IEC 958 audio interface format. An output of the input unit 62 is coupled to an input 64 of an audio decoder 66. The audio decoder 66 can have various audio outputs, such as the outputs 68,70 for supplying the left (L) and right (R) hand signal components of the PCM encoded stereo audio signal, the outputs 72, 74 and 76 for supplying the centre signal (C), the left surround signal (Ls) and the right surround signal (Rs), respectively, and further, if required, outputs 78,80 for supplying a centre left (Lc) and centre right (Rc) signal component.

When the apparatus 1 is in the first reproduction mode, prior to the time instant $t_0$ (see FIG. 2a), it supplies a PCM encoded audio signal to the external decoder 3, via the IEC 958 interface 2. In response thereto, the decoder 3 supplies a stereo signal L,R via its outputs 68,70. Upon switching the apparatus 1 into the second reproduction mode, the decoder 3 receives a muted signal during the time interval between $t_0$ and $t_2$ and thus supplies no output signal (in fact a zero output signal) to its outputs. 'Somewhere' in the time interval between the time instants $t_1$ and $t_2$, the audio decoder 3 detects the change in value of the bit $b_1$ in the channel status signal, so that it switches the audio decoder 66 into an MPEG audio decoding mode.

After the time instant $t_2$, the audio decoder 3 receives the MPEG encoded multi channel audio signal via the interface 2, which can be decoded by the decoder 3 in a correct way.

Whilst the invention has been described with reference to preferred embodiments thereof, it is to be understood that these are not limitative examples. Thus, various modifications may become apparent to those skilled in the art, without departing from the scope of the invention, as defined by the claims.

Further, the invention lies in each and every novel feature or combination of features.

Related Documents (D1) JEI, December 1996, pp. 21–25, the publication titled 'Intriguing DVD technology opens broad possibilities'.
(D2) International Standard IEC 958, first edition, 1989–03.
(D3) Published PCT patent application no. WO 97/133,339-A1, which corresponds to U.S. Ser. No. 08/724,390 (PHN 15.503)
(D4) PCT international patent no. IB 96/1267 (PHN 15.603)

What is claimed is:

1. An apparatus for reproducing a digital audio signal from a record carrier having a first digital audio signal recorded in a first format and a second digital audio signal recorded in a second format, the apparatus comprising:
   read means for reading an information signal from the record carrier,
   decoding means for channel decoding the information signal into a decoded information signal,
   input means for receiving a selection signal,
   output means for supplying an output signal which includes either the first digital audio signal or the second digital audio signal in response to the selection signal, and supplying an identification signal indicating whether the output signal includes the first digital audio signal or the second audio signal, and
   muting means for muting the output signal supplied by the output means when the output signal is switched from the first digital audio signal to the second digital audio signal, said switching in response to an occurrence of the selection signal for selecting the second audio signal, and for maintaining the output means in a muted situation during a time interval between initiation of said switching until completion of said switching,
   the time interval being sufficient to reduce output signal distortions.

2. The apparatus as claimed in claim 1, wherein the time interval has a length that is larger than or equal to the time required in a receiver coupled to the apparatus via the output means to detect the change in the identification signal.

3. The apparatus as claimed in claim 2, wherein said time interval has a length larger than 2 ms.

4. The apparatus as claimed in claim 1, wherein the first digital audio signal is a PCM encoded audio signal, and wherein the second digital audio signal is an MPEG encoded audio signal.

5. The apparatus as claimed in claim 1, wherein the output means is adapted to supply the output signal on an IEC 958 interface channel, and wherein the identification signal is a second bit (b1) in the channel status signal on the IEC 958 interface.

6. A method of reproducing a digital audio signal from a record carrier having a first digital audio signal recorded on it in a first format and a second digital audio signal recorded on it in a second format, the method comprising the steps of:
   reading an information signal from the record carrier,
   channel decoding the information signal into a decoded information signal,
   receiving a selection signal,
   supplying an output signal which includes either the first digital audio signal or the second digital audio signal in response to the selection signal, the output signal including an identification signal indicating whether the output signal includes the first digital audio signal or the second audio signal, and
   muting the output signal occurring when the output signal is switched from the first digital audio signal to the second digital audio signal said switching in response to an occurrence of the selection signal for selecting said second audio signal, and maintaining the muted situation from a time interval between initiation of said switching until completion of said switching,
   the time interval being sufficient to reduce distortion in the output signal.

7. The method of claim 6, wherein the time interval has a length that is larger than or equal to the time required in a receiver adapted to detect the change in the identification signal when the output signal is switched from the first digital audio signal to the second digital audio signal.

8. The method of claim 7, wherein said time interval has a length larger than 2 ms.

* * * * *